United States Patent [19]

Noguchi et al.

[11] 4,023,539
[45] May 17, 1977

[54] FUEL-REFORMING DEVICE FOR INTERNAL COMBUSTION ENGINES

[75] Inventors: Masaaki Noguchi, Nagoya; Tsuchio Bunda, Okazaki; Masaharu Sumiyoshi, Toyota; Yasuo Kondo, Anjo, all of Japan

[73] Assignee: Toyota Jidoshi Kogyo Kabushiki Kaisha, Japan

[22] Filed: Dec. 8, 1975

[21] Appl. No.: 638,853

[30] Foreign Application Priority Data

Dec. 11, 1974 Japan .................... 49-142718

[52] U.S. Cl. ................. 123/3; 123/75 B; 123/127
[51] Int. Cl.² .......................... F02B 43/08
[58] Field of Search ....... 123/3, 1 A, 119 E, 122 G, 123/127, 75 B, 180 R, 32 ST, 119 R

[56] References Cited

UNITED STATES PATENTS

| | | | |
|---|---|---|---|
| 3,171,395 | 3/1965 | Bartholomew | 123/127 |
| 3,688,755 | 9/1972 | Grayson | 123/3 |
| 3,828,736 | 8/1974 | Koch | 123/3 |
| 3,901,197 | 8/1975 | Noguch | 123/3 |
| 3,908,606 | 9/1975 | Toyoda | 123/3 |
| 3,955,538 | 5/1976 | Noguch | 123/3 |
| 3,955,538 | 5/1976 | Holzupfel | 123/75 B |
| 3,960,121 | 6/1976 | Bacus | 123/3 |

Primary Examiner—C. J. Husar
Assistant Examiner—Daniel J. O'Connor
Attorney, Agent, or Firm—Oblon, Fisher, Spivak, McClelland & Maier

[57] ABSTRACT

An apparatus for controlling a fuel to be supplied to a reforming means in accordance with an air flow passing through an auxiliary air fuel mixture supplying pipe by providing an auxiliary air fuel mixture supplying pipe parallelly to a main air fuel mixture supplying pipe connected to a combustion chamber of a cylinder, interposing the fuel reforming means having a combustion chamber in the supplying pipe for said auxiliary air fuel mixture, injecting the fuel into said reforming means and then reforming said fuel together with the mixture through igniting and burning.

18 Claims, 15 Drawing Figures

PERFORMANCE ATTAINED BY
THE ADDITION OF SYNTHETIC GAS

FIG. 7 H₂ EFFCT (INTRODUSTIONS OF THE EXHAUST GAS TO THE SUB-CHAMBER)

C2H4 (ETHYLENE) EFFECT

FIG. 15

| COMPONENT OF THE REFORMED FUEL / COMPONENT TYPE | J-1 | | J-2 | | I-1 | | I-2 | | I-3 | | K-1 | | K-2 | | K-3 | | M-1 | | M-2 | | M-3 | |
|---|---|---|---|---|---|---|---|---|---|---|---|---|---|---|---|---|---|---|---|---|---|---|
| % | WT% | MOL% | WT% | MOL% | WT% | MOL% | WT% | MOL% | WT% | MOL% | WT% | MOL% | WT% | MOL% | WT% | MOL% | WT% | MOL% | WT% | MOL% | WT% | MOL% |
| LFG | 30 | 19 | 30 | 20 | 30 | 1 | 30 | 2 | 30 | 5 | 30 | 11 | 30 | 14 | 30 | 17 | 30 | 17 | 30 | 11 | 30 | 7 |
| H2 | — | — | — | — | 70 | 99 | 35 | 96 | 10 | 79 | — | — | — | — | — | — | — | — | 2 | 38 | 5 | 62 |
| C2H4 | — | — | — | — | — | — | — | — | — | — | 70 | 89 | 35 | 58 | — | — | — | — | — | — | — | — |
| C4H8 | 70 | 81 | — | — | — | — | — | — | — | — | — | — | — | — | — | — | 10 | 21 | 8 | 11 | 5 | 4 |
| C4H10 | — | — | 70 | 80 | — | — | 35 | 2 | 60 | 16 | — | — | 35 | 28 | 60 | 62 | 60 | 62 | 40 | — | — | — |
| LFG | 7.5 | 2.5 | 7.5 | 2.5 | 7.5 | 0.7 | 7.5 | 1 | 7.5 | 1.8 | 7.5 | 2.3 | 7.5 | 2.4 | 7.5 | 2.5 | 7.5 | 2.5 | 7.5 | 2.3 | — | 27 |
| H2 | — | — | — | — | — | — | — | — | — | — | — | — | — | — | — | — | — | — | — | — | 60 | 2.1 |
| C2H4 | — | — | — | — | 17.5 | 76.7 | 8.8 | 61 | 2.5 | 30 | — | — | — | — | — | — | — | — | 0.5 | 7.7 | 13 | 18 |
| C4H8 | — | — | — | — | — | — | — | — | — | — | 17.5 | 19 | 8.8 | 10 | 2.5 | 3 | 2.5 | 3 | 2 | 2.2 | 1.3 | 1.3 |
| C4H10 | 17.5 | 10.5 | 17.5 | 10.5 | — | — | — | — | — | — | — | — | — | — | — | — | — | — | — | — | — | — |
| AIR | 75 | 87 | 75 | 87 | 75 | 22.7 | 75 | 35.2 | 75 | 62 | 75 | 78.7 | 75 | 82.7 | 75 | 85.9 | 75 | 85.9 | 75 | 79.8 | 75 | 71.6 |

COMPONENT OF THE REFORMED FUEL MIXED WITH AIR

FUEL-REFORMING DEVICE FOR INTERNAL COMBUSTION ENGINES

BACKGROUND OF THE INVENTION

1. Field of the Invention

The present invention relates generally to a fuel supply device for an internal combustion engine, and more specifically to a fuel supply device for an internal combustion engine in which a lean mixture gas is supplied by the main carburetor, and at the same time, a fuel-reforming device coupled with an auxiliary carburetor, produces a reformed fuel gas to be supplied to the engine, thereby decreasing the harmful substances in the exhaust gas.

2. Description of the Prior Art

It is a well-known fact that the amount of harmful substances, such as for example, NOx, CO, HC, or the like, present within the exhaust gases emitted from an internal combustion engine depends upon the air-fuel ratio of the mixture within the cylinders, and if the air/fuel ratio is made larger than its theoretical value (in case of NOx, slightly larger than its theoretical value), the quantity of such harmful substances decreases. Therefore, the higher the air/fuel ratio with which the internal combustion engine is driven, the less will be the harmful emissions from the engine. In a common spark-ignition engine, however, when the air/fuel ratio exceeds a value of approximately 17, the engine misfires and a smooth operation becomes virtually impossible. Moreover, along with the emission of unburnt gases, there is a substantial increase in the quantity of harmful substances (mainly HC).

SUMMARY OF THE INVENTION

Recently as a means of preventing the generation of harmful emissions from internal combustion engines, internal combustion engines of the stratified charge type and of the hydrogen added type have been proposed, and consequently, the primary object of the present invention is to provide a practical fuel-reforming device applicable for such internal combustion engines.

Another object of the present invention is to provide a motor-vehicle-mounted fuel-reforming device which can reform the hydrocarbons present within the fuel into primarily low-molecular paraffin hydrocarbons, and low-class olefin hydrocarbons chiefly composed of ethylene, hydrogen, and carbon monoxide.

Still another object of the present invention is to provide a motor-vehicle mounted fuel-reforming device which produces a reformed fuel through means of an initial reaction within which the mixture is thermally cracked or catalyzed in its burning portion and its vaporizing portion, and through a subsequent reaction within which the hydrocarbons within the fuel and water vapor generated, and the carbon dioxide yielded within the initial reaction, are reacted together through means of a catalyst with use of the heat generated by the initial reaction.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 15 is a chart which shows the components of the reformed fuel and of the reformed fuel when mixed with air.

DETAILED DESCRIPTION OF THE PREFERRED EMBODIMENTS

In the case of stratified charge engine, a lean mixture and a rich mixture are separately supplied from a main carburetor and an auxiliary carburetor, and within a pre-combustion or auxiliary combustion chamber of the cylinder, wherein the ignition plug is provided, a layer of the rich mixture is formed, and within the main combustion chamber, a layer of the lean mixture is formed. The rich mixture is ignited by means of the spark plug, and using the torch flame produced thereby, the lean mixture within the main combustion chamber, which is too lean to be ignited by means of the common spark ignition, is in fact ignited and burned. Similarly, in the case of the hydrogen-added engine, a lean mixture, which has been produced within a carburetor and to which has been added hydrogen or a hydrogen-rich gas fuel, is ignited within the cylinder by means of a spark plug, whereby a mixture which is too lean to be ignited by means of the common spark ignition, can in fact be ignited and burned.

In both cases, the amount of harmful substances present within the exhaust gas, depends upon the overall air/fuel ratio averaged for the rich and the lean mixture, and such quantity of harmful substances may be reduced by selecting an adequately high value for this overall air/fuel ratio. Of course, it would be possible to apply the stratified charge combustion system to the hydrogen-added engine, however, the application can also be easily extended to a common internal combustion engine. If the lean mixture from the conventional carburetor is blended with hydrogen or a hydrogen-rich gas before being supplied to the cylinder, so as to thereby yield a mixture with a high overall air/fuel ratio, this enriched mixture then being supplied to each cylinder.

Figure 1:
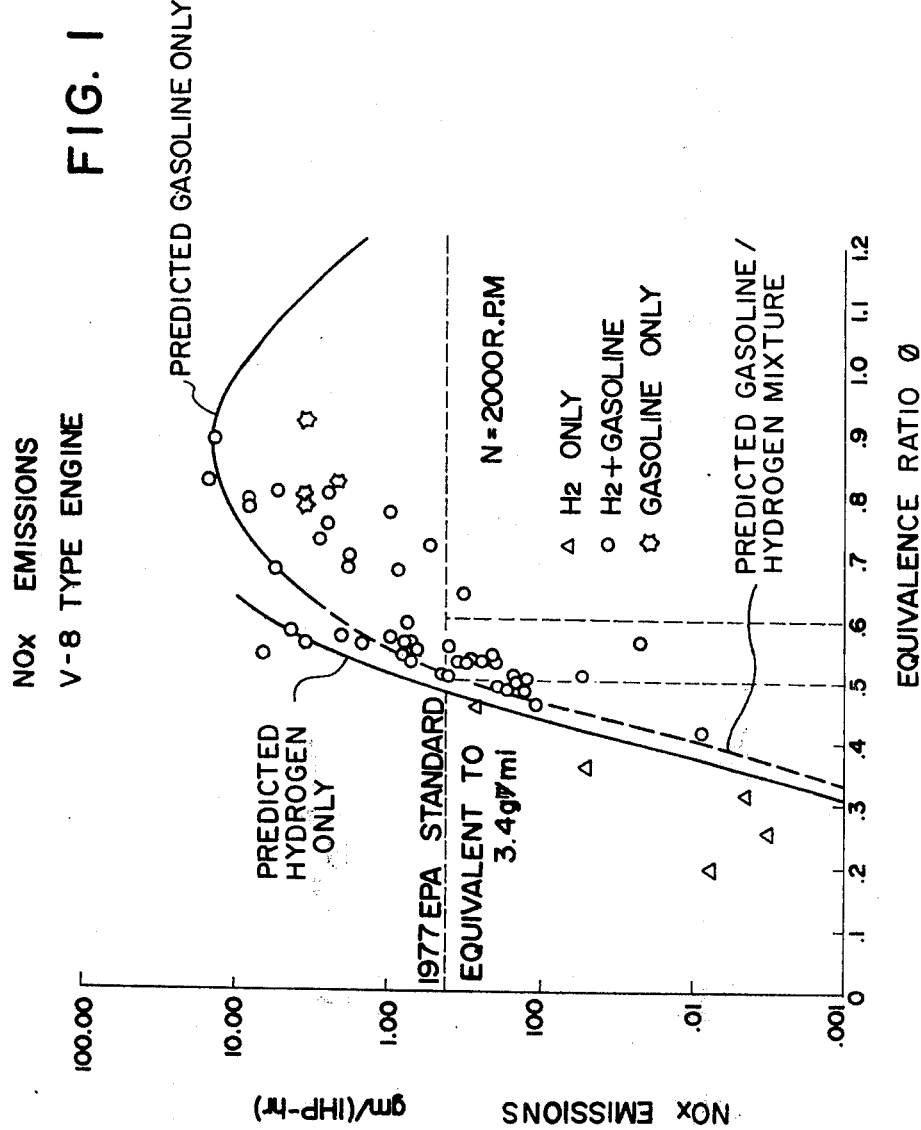
FIG. 1 is a graphical view of the NOx emissions of a V-8 engine as a function of the equivalence ratio.
Figure 2:
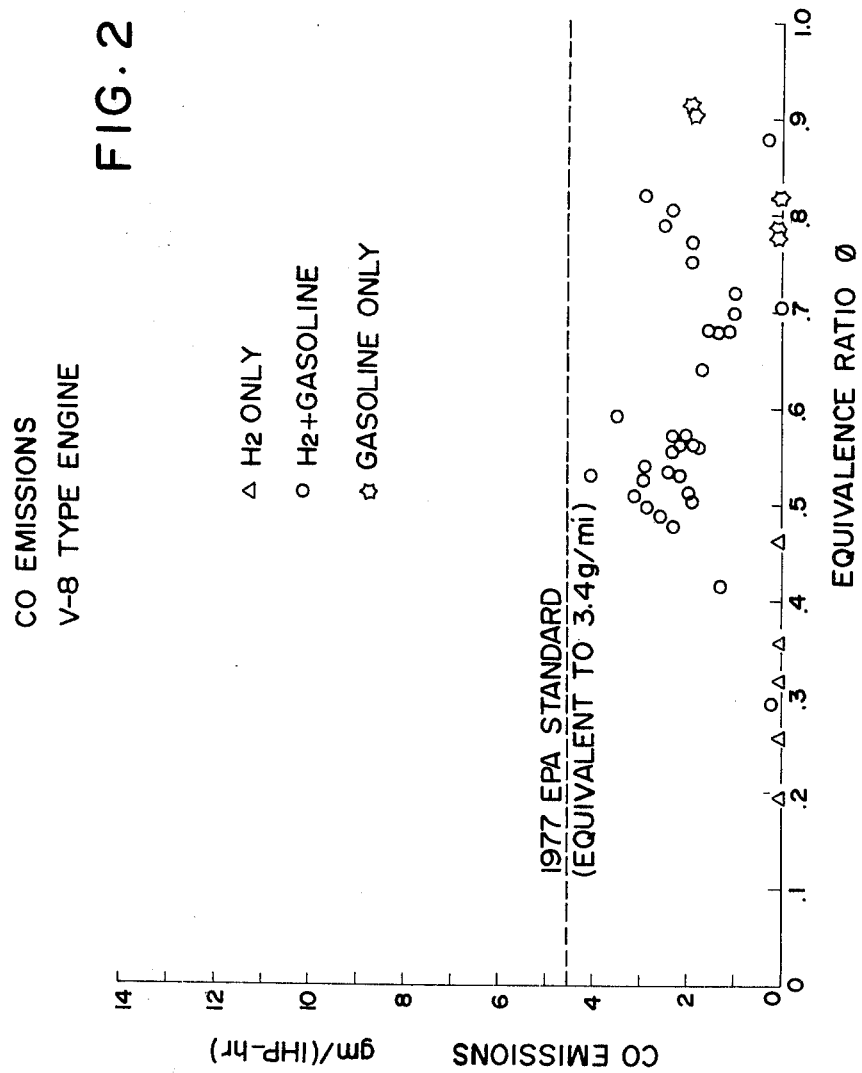
FIG. 2 is a view similar to that of FIG. 1, showing however the CO emissions of a V-8 engine as a function of the equivalence ratio.
Figure 3:
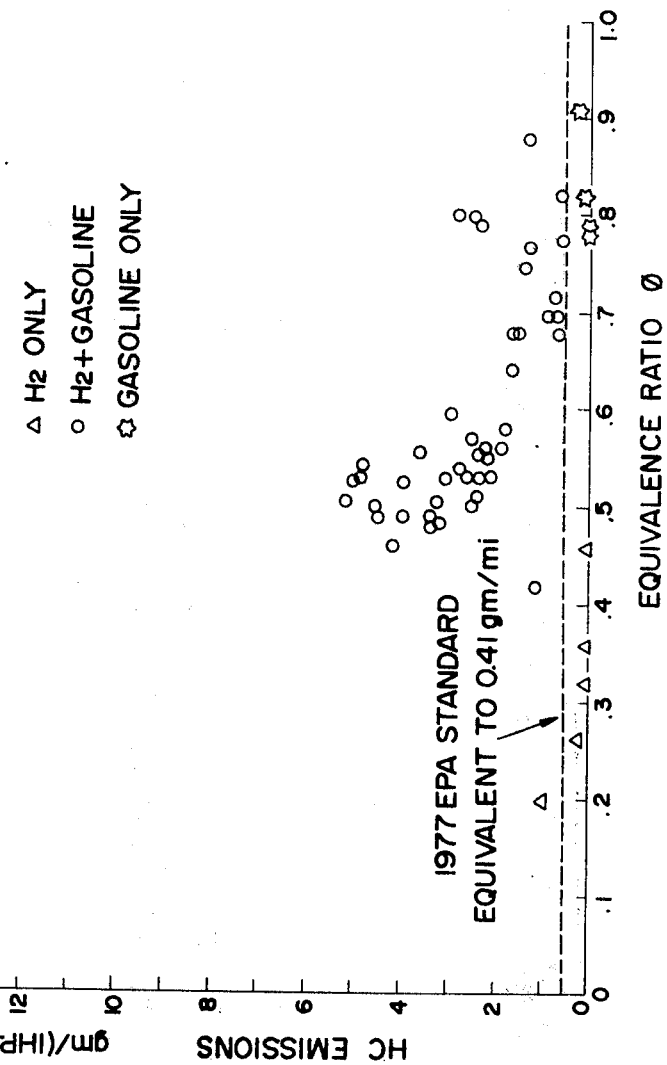
FIG. 3 is a view similar to that of FIG. 1, showing however the HC emissions of a V-8 engine as a function of the equivalence ratio.
Figure 4:
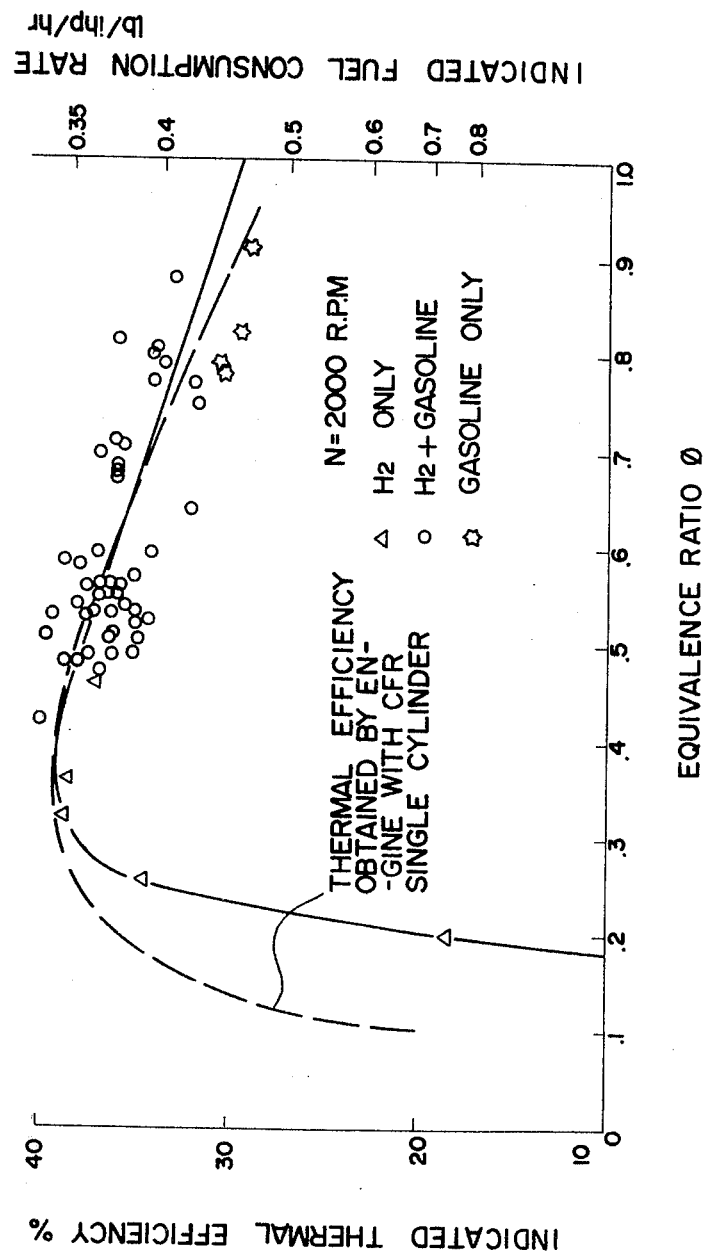
FIG. 4 is a view similar to that of FIG. 1, showing however the thermal efficiency and the fuel consumption rate of a V-8 engine, under the conditions when $H_2$ is used alone, when $H_2$ + gasoline is used, and when gasoline is used alone, respectively, as a function of the equivalence ratio.

The effect of hydrogen addition will first be considered, citing experimental data obtained when the mixture from a conventional carburetor was employed and when hydrogen or a hydrogen-rich fuel gas was added to the mixture. Such data is shown within FIGS. 1–5 (cited from literature of the U.S.A. California Technical Institute JPL, published June 1974). Within FIGS. 1–3, the amounts of harmful substances, such as for example, NOx, CO, HC, or the like, as generated per hour × HP and within the same V-8 spark ignition gasoline engine, are indicated, under operating conditions wherein the rpm and the load are maintained constant, the ignition advance angle is set at MBT (minimum spark advance for best torque), and the air/fuel ratio is varied.

For a qualitative description of the mixture, the fuel equivalent ratio $\phi$ (which is derived as a result of dividing, the ratio of the fuel and air supplied, by the theoretical fuel/air ratio at which a chemically perfect combustion takes place, that is to say, which is inverse number of air excessive rate is adopted, and the value of the equivalence ratio $\phi$ being less than 1 means that the mixture is a lean one with its air/fuel ratio larger than the theoretical value. Data are plotted for the respective cases of the fuel being common gasoline alone, $H_2$ added to gasoline, and $H_2$ alone, and within FIG. 4, the thermal efficiency and the fuel consumption rate are compared under the same operating conditions as within FIGS. 1–3.

From these FIGURES, it is known that when conventional gasoline alone is used, operation is possible only up to $\phi \approx 0.8$, however, when $H_2$ is added to the gasoline, the operation becomes possible up to $\phi \approx 0.5$, and even if the mixture is lean, the NOx emission rate and the CO emission rate can be decreased, the indicated thermal efficiency can be increased and the indicated fuel consumption rate can be decreased, although a slight increase in the HC emission rate does occur. Within the conventional gasoline engine when $\phi$ is less than 0.7, HC emission is sharply increased as a result of misfiring, and it cannot in fact be eliminated even by an exhaust gas treating device, such as for example, a thermal reactor. However, in this case, the increase in HC is such that it can be disposed of far more easily, and thus, considering the overall effect of decreasing the quantities of NOx and CO, it would be far more advantageous to operate an engine using more leaner mixture, with the addition of $H_2$, than merely using conventional gasoline.

Figure 5:
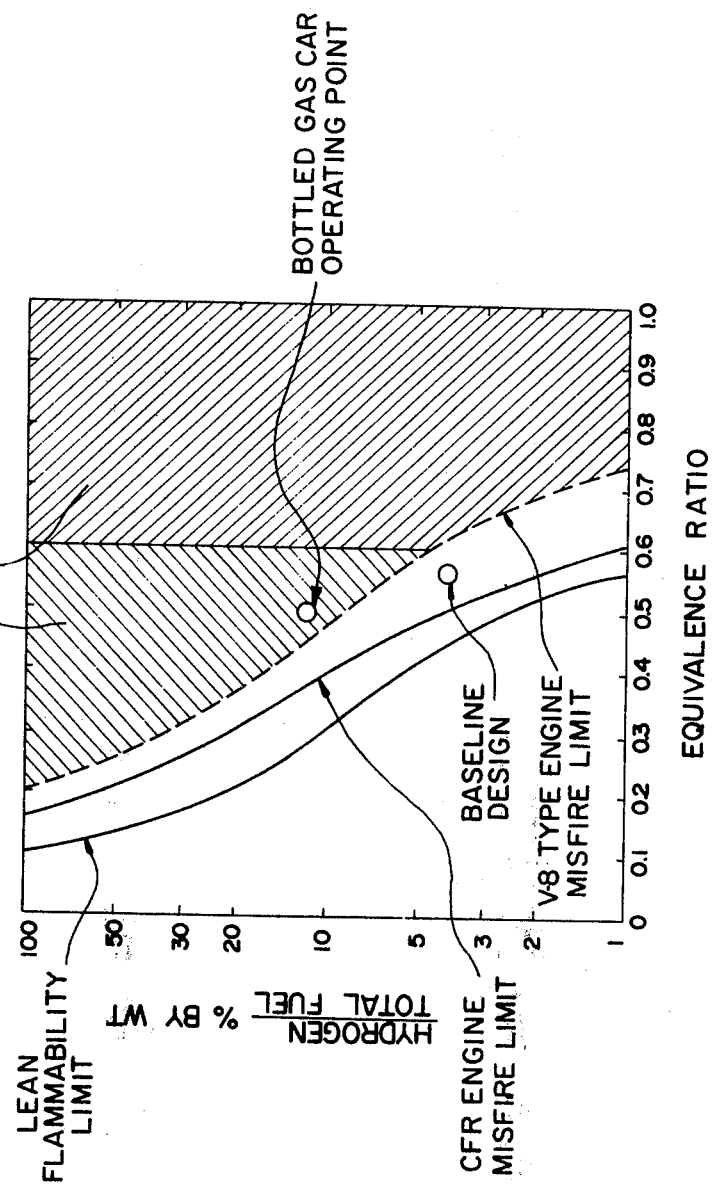
FIG. 5 is a view similar to that of FIG. 1, showing however the required percentage amounts of hydrogen for the engine, as a function of the equivalence ratio.

Within FIG. 5, with the weight % of $H_2$ within the total fuel plotted along the ordinate axis, and the equivalence ratio $\phi$ plotted along the abscissa axis, it is shown that the addition of $H_2$ to the fuel to be supplied as a mixture to the engine can in fact assure engine operation without misfiring. From this Figure, it is also known that an addition of $H_2$ of less than 10%, depending upon the selected value of the fuel equivalence ratio $\phi$ of the mixture will suffice for the foregoing purposes.

The fuel-reforming device, constructed in accordance with the present invention, serves to intentinally increase the proportion of the $C_2H_4$, as well as that of the $H_2$, content of the gas to be specified value. For the purpose of increasing the content of the $H_2$ alone, the fuel-reforming condition, especially the reforming temperature, must be elevated, however, the elevation of the combined content of $C_2H_4 + H_2$ will relax the reforming condition and satisfy the intended purpose. After strenuous efforts with careful attention being maintained with respect to this fact, the present inventors have developed an internal combustion engine which is equipped with a practical reforming device that can reduce the harmful emissions from the engine.

Figure 6:
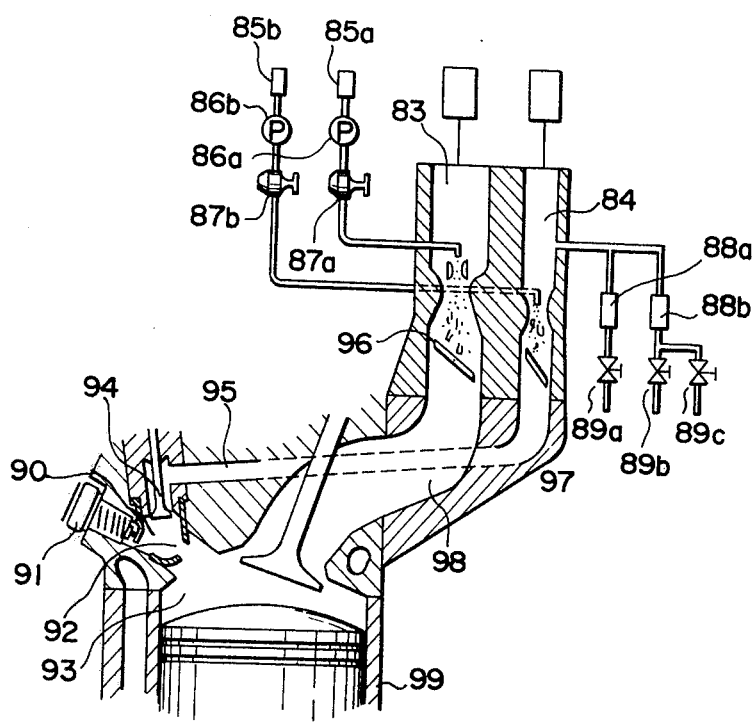
FIG. 6 is a schematic, cross-sectional view of a layered combustion engine with a pre-combustion or auxiliary combustion chamber which was used in the present experiments.
Figure 7:
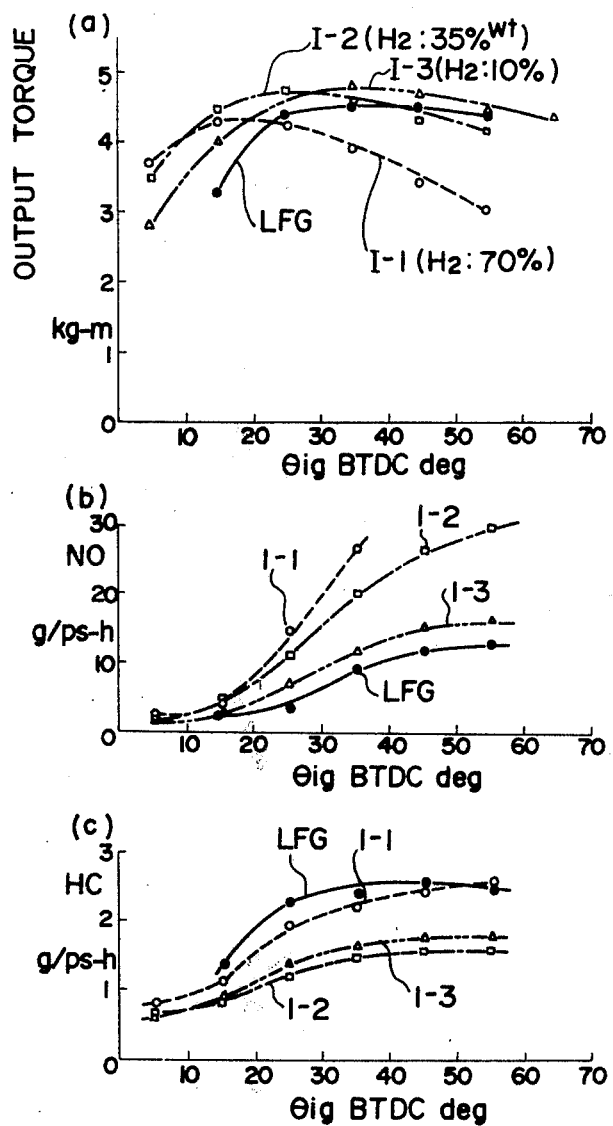
FIGS. 7-10 are graphical views which indicate the changes in the output torque, the NOx emission rate, and the HC emissions, under varied proportions of $H_2$ and $C_2H_4$ within the stratified charge combustion engine illustrated within FIG. 6, such FIGURES respectively representing the $H_2$ effect, the $C_2H_4$ effect, the olefin-paraffin effect, and the synergistic effect of $H_2$ and $C_2H_4$.
Figure 8:
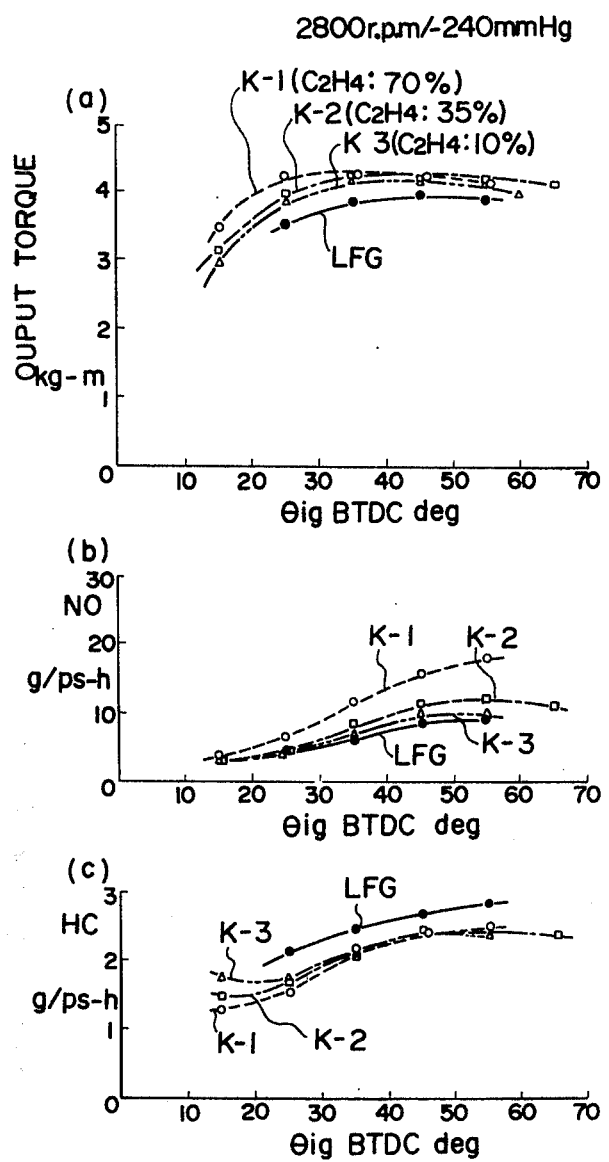
Figure 9:
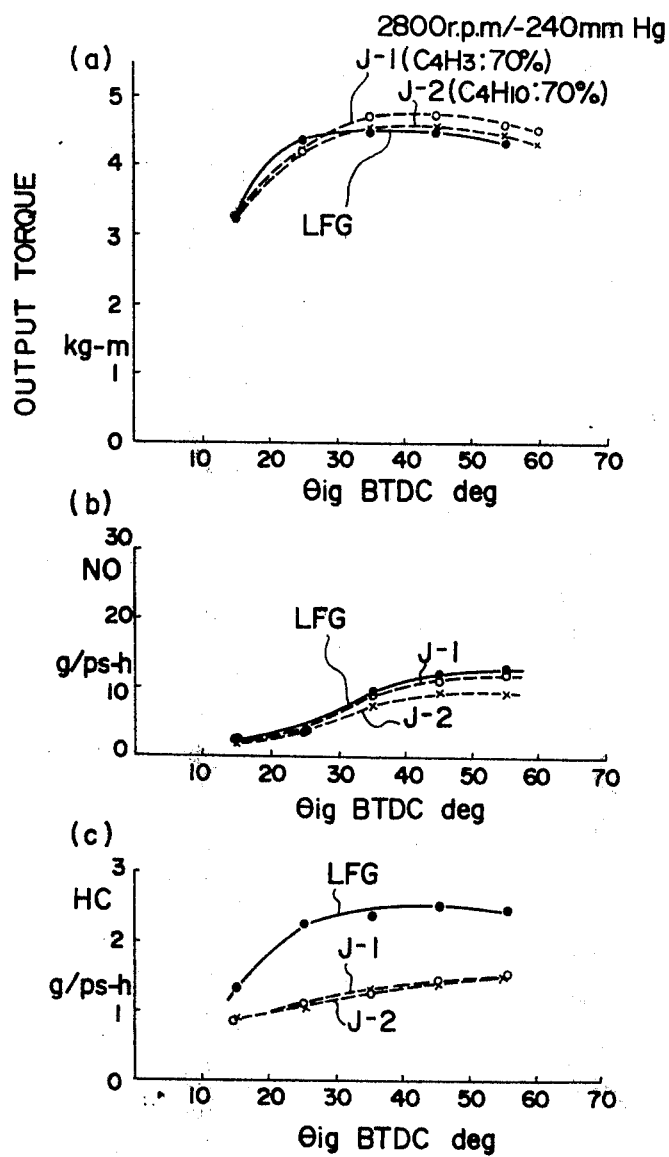
Figure 10:
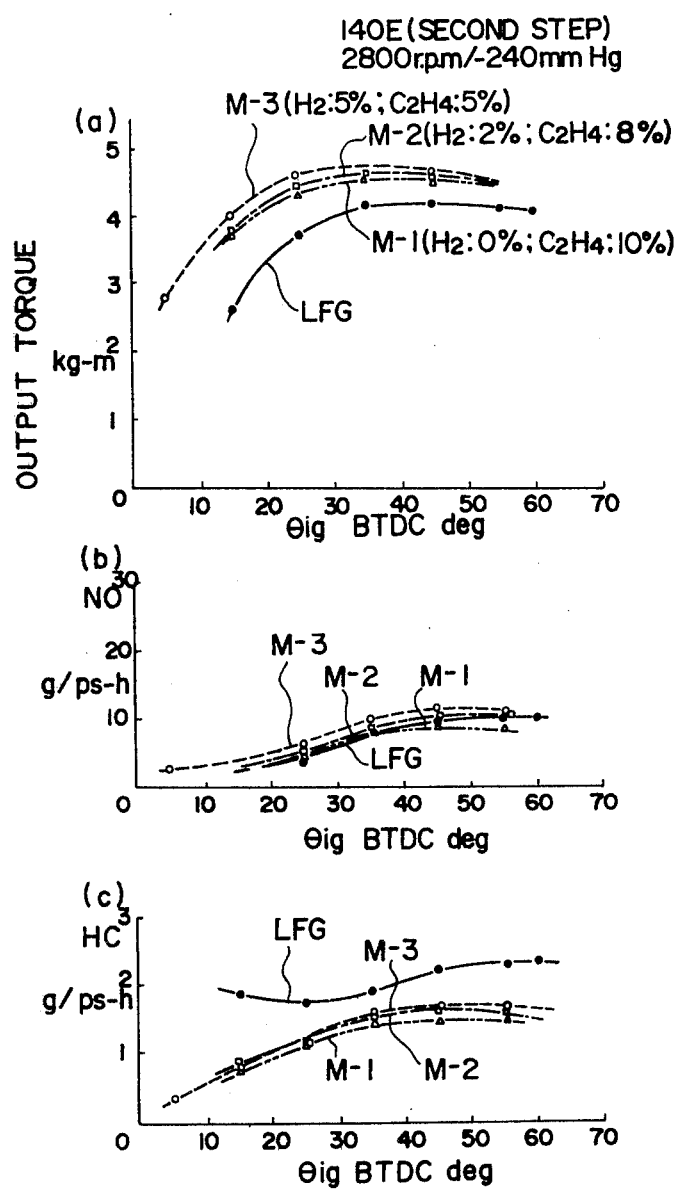

It will now be demonstrated by experimental examples that there is no substantial difference in the effect intended to be accomplished by the present invention, whether the reformed gas supplied as a rich mixture to the engine is $H_2$ alone or a mixture of $H_2 + C_2H_4$. FIG. 6 schematically shows a stratified charge combustion engine, having a pre-combustion or auxiliary combustion chamber, which has been used within the experiments, the description, however, being omitted with respect to the stratified charge combustion engine, having an auxiliary chamber which is known within the prior art, and being confined to those structural component parts which characterize the experimental apparatus. The lean mixture generating part 83, corresponding to the main carburetor, and the rich mixture generating part 84, corresponding to the auxiliary carburetor, are supplied with fuel gasoline through means of flow meters 85a and 85b, fuel pumps 86a and 86b, and pressure-control valves 87a and 87b.

The rich mixture generating part 84 is additionally supplied with $H_2$, CO, $C_2H_4$, $C_4H_{10}$, and the like, from bombs, through means of the flow rate-adjust valves 89a, 89b, and 89c, and the gas flow meters 88a and 88b, in various proportions. The rich mixture is conducted through the passageway 95 for each engine cylinder to the auxiliary combustion chamber 90, while the lean mixture is conducted through the intake manifold 98 to the main combustion chamber 93. Spark ignition occurs at the spark plug 91 disposed within auxiliary combustion chamber 90 and the torch flame generated thereby spouts out of the orifice 92 so as to ignite the lean mixture within the main combustion chamber 93.

Within such a stratified charge combustion engine, using a synthetic fuel with varied contents of $H_2$, $C_2H_2$, and the like, as indicated within FIG. 15 as the fuel for a rich mixture to be supplied to the auxiliary combustion chamber 90, the changes in the output torque and the emission rates of NOx and HC, when the overall air/fuel ratio, the rich mixture air/fuel ratio, the rpm, and the load were fixed and the ignition timing was varied, were compared, and the results are shown within FIGS. 7 to 10.

As a result of certain variances within the overall air/fuel ratio $\alpha$ T, the output performance for the gasoline taken as a standard, was inconsistent within FIGS. 7–10, however, with an increase in the addition of $H_2$, the flame propagation speed was made faster, and as a result, the advance angle of the MBT (minimum-spark advance for best torque) can be retarded. Usually the leaner the mixture, the slower the flame propagation speed, and accordingly the spark advance must be advanced, however, too much promotion of spark advance during the compression stroke will render the compression incomplete, thereby causing firing to be more difficult.

When, however, $H_2$ is present, the advance can be retarded even compensating the required advance for the leanness of the mixture, and moreover, a more leaner combustion can be assured. Too much addition of $H_2$ will, however, deteriorate the mixture charging efficiency, resulting in a decreased output, and accordingly, there will not be a substantial reduction in the NOx emission under same output conditions. When the addition of $C_2H_4$ is increased, the flame propagation speed is likely to increased in a similar manner as when $H_2$ is added, however, the NOx emission rate under same output conditions will be low. In the case of $H_2 + C_2H_4$ being added, the effects of the two appear synergistically.

Figure 11:
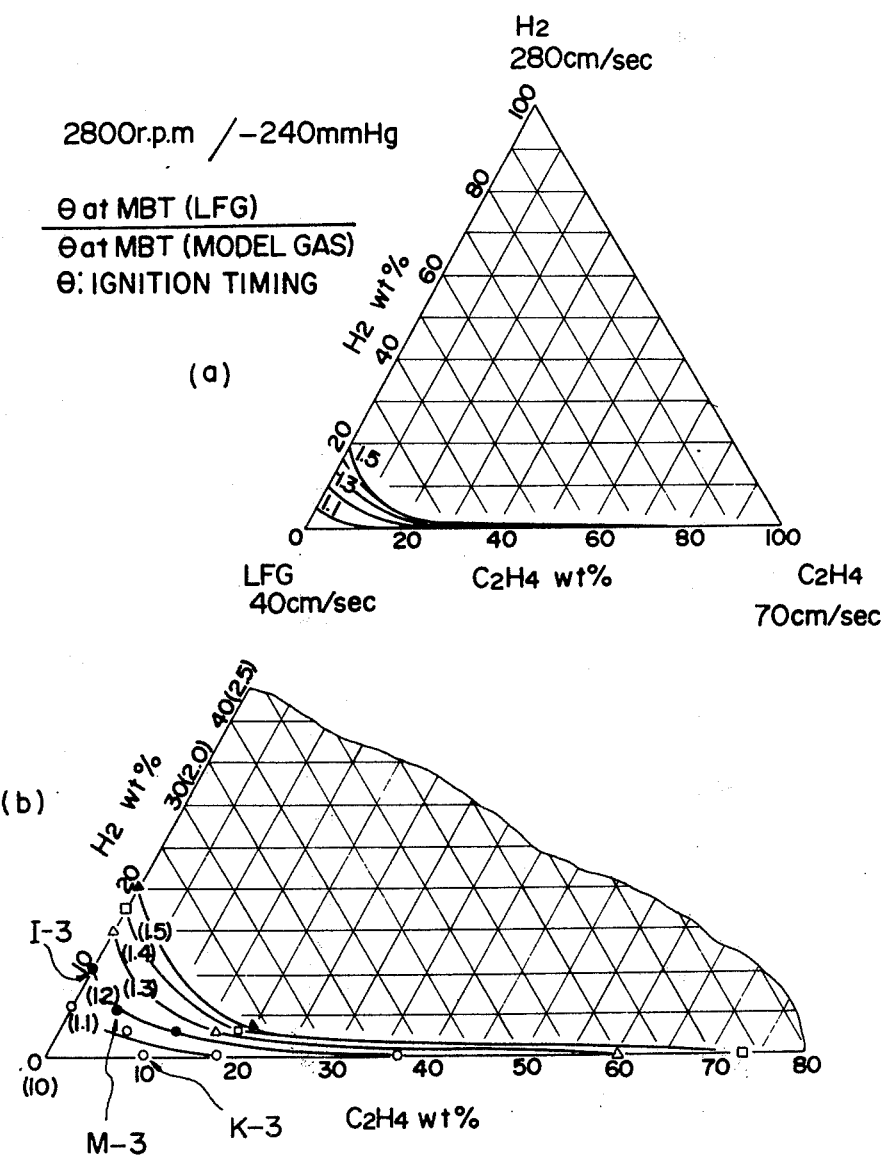
FIGS. 11(a) and 11(b) are equivalent curves for C, which may be expressed as $$c = MBT \text{ for gasoline only}/MBT \text{ for gasoline with additives};$$

Based upon these results, the equivalence curve C is plotted within FIGS. 11(a) and 11(b), with the criterion of the flame propagation speed taken as $$c = MBT \text{ for gasoline only}/MBT \text{ for gasoline with additives}$$

wherein the composition $H_2 + C_2H_4$ upon the equivalence curve is for the same flame propagation speed. In other words, the plots for 10% $H_2$ and the plot for 5% $H_2 + 5\%$ $C_2H_4$ both correspond to the flame propagation speed ratio of 1.2. Consequently, it may be maintained that the lean flame propagation speed obtained for a 10% $H_2$ addition can likewise be obtained with an addition of 5% $H_2 + 5\%$ $C_2H_4$.

The low-class aliphatic hydrocarbons and other gaseous hydrocarbons, CO, $H_2$, and the like, which are the decomposition and oxidation products of the fuel hydrocarbons, contribute to the flame propagation speed and to the improvement of the combustion itself, and this is especially true when these products exist near the ignition source and the flame front, whereby they are useful for improving the ignition and combustion. By thermal cracking and contact cracking of the hydrocarbon fuel consisting of various chemical composition under the presence of the moderate amount of oxygen, the formation of free radicals by split of the carbon bonds in the hydrocarbon fuel may be achieved; and the extraction of hydrogen may occur, and as a result a mixture of low-molecular paraffin and olefin hydrocarbons is yielded.

The composition of the mixture differs depending upon the composition of the fuel hydrocarbon and the decomposition conditions, however the main component is ethylene, that is, a low-class aliphatic olefin hydrocarbon. Thermal and contact cracking are known as processes for manufacturing, from petroleum hydrocarbons, low-class olefins, such as for example, ethylene and propylene, which are chemical materials, and also known as method of contact for heavy oils. A method of gasifying the petroleum hydrocarbons is also known within which fuel oil hydrocarbons are partially oxidized or steam-reformed in the presence of moderato amounts of oxygen or steam, thereby converting them to a mixture of low-molecular paraffin and olefin hydrocarbons, $H_2$, CO, and the like.

The decomposed, oxidized mixture, useful for improving the flame propagation speed and the combustion per se of the mixture within the cylinders, and which is to be treated within this device, is composed of low-class olefin hydrocarbons mainly comprising ethylene, low-class paraffin hydrocarbon, $H_2$, CO, and the like. The reactions required to form these effective components broadly consist of an initial reaction, with its ancillary reaction, and a subsequent reaction. The initial reaction, with its ancillary reaction, includes the thermal or contact cracking, while the subsequent reaction includes the partial oxidation or the steam-reforming. Within the device constructed in accordance with the present invention, the initial reaction and the subsequent reaction are coordinated such that mass transfer and thermal balance may effectively occur.

Within the initial reaction, with its ancillary reactions, which aims at the formation of the low-class olefin hydrocarbons and low-class paraffin hydrocarbons mainly composed of ethylene, the major reaction is combustion within which a part of the fuel is ignited for combustion and the remaining mixture is vaporized and blended so as to thereby yield the necessary heat for sustaining the subsequent reaction and supplying the necessary steam and carbon dioxide in order to cause or generate the reactions between the hydrocarbons and the steam and between the hydrocarbons and the carbon dioxide within the subsequent reaction. Meanwhile, within the ancillary reaction thereof, the unburnt residue or the fuel oil hydrocarbons secondarily added are directly cracked by means of the inherent heat which is obtained by retaining the generated heat and maintaining the reaction. Alternatively, they are subjected to contact cracking by passage through an alumina grating space of a specific volume together with the gases yielded as a result of the high temperature combustion.

Similarly, within the subsequent reaction, which is aimed at the generation of hydrogen and carbon monoxide in increased quantities, using the steam and carbon dioxide yielded within the initial combustion, and the generated heat, the unburnt residue or the fuel oil hydrocarbons secondarily added are reformed upon a nickel catalyst carried by an alumina-silica-magnesia system refractory, and the reaction products are cooled through an endothermic reaction while passing through the catalyst bed.

Within the fuel-reforming device constructed in accordance with the present invention, the composition of the decomposed and oxidized products of the fuel oil hydrocarbons can be set, such as to be able to effectively take part in the combustion of the mixture within the cylinders, by considering the proportions of the reactions, that is, the initial reaction, its ancillary reaction, and the subsequent reaction, relative to the entire reaction.

What has been described so far may be summed up as the possibility of igniting and combusting a mixture too lean to be normally ignited through means of ordinary spark ignition, when, even in a conventional engine, a reformed gas fuel containing $H_2$ or $C_2H_4 + H_2$ is added to such lean mixture. In addition, the usefulness of a motor-vehicle mounted reformed gas generator as a means of reducing the harmful emissions from a practical engine, and the availability of the same effect or result as that achieved when a rich mixture, within the stratified charge combustion engine having the auxiliary combustion chamber, is replaced with a reformed gas obtained from the fuel-reforming device, have been demonstrated by the noted citations and experimental data.

Figure 12:
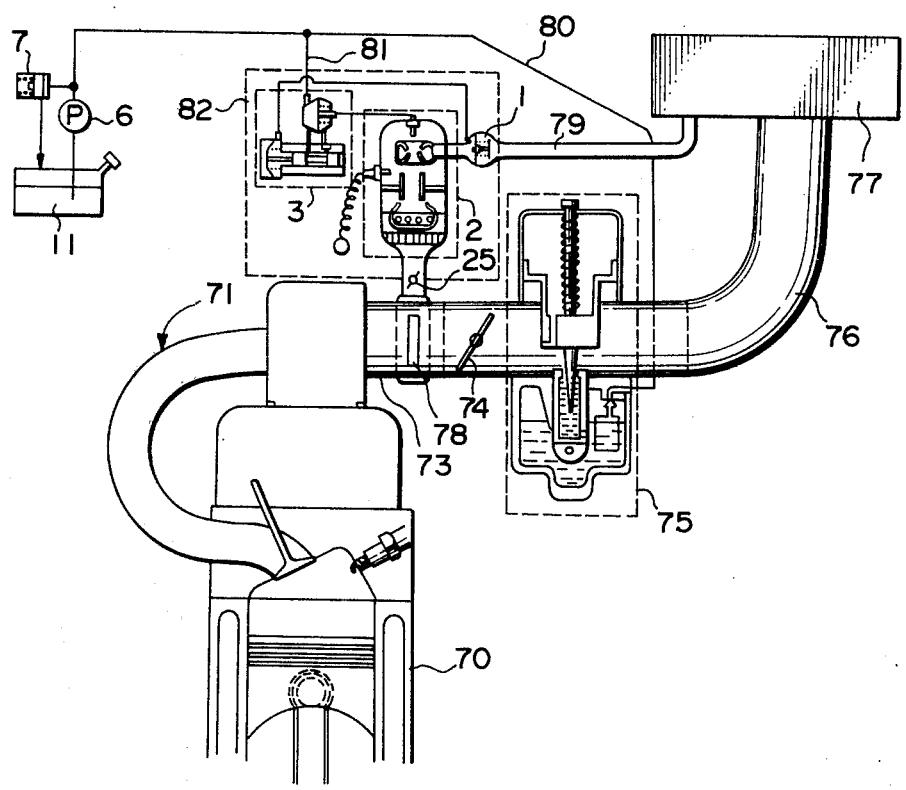
FIG. 12 is a schematic diagram of the entire internal combustion engine comprising a motor-vehicle mounted fuel-reforming device constructed in accordance with the present invention.

Referring now to FIG. 12, the entire structural arrangement of the engine-mounted fuel reforming device, invented through the strenuous efforts of the present inventors in order to attain the aforenoted purposes, will now be explained, the embodiment illustrated herein being a reformed gas adding system. The engine is shown at 70, and a intake manifold is shown at 71. An adaptor 73 is provided upstream of manifold 71 so as to facilitate the blending of a lean mixture conducted thereto from a main carburetor 75 with a rich mixture of gas fuel conducted thereto from a reforming device 82, and the resultant mixture is then delivered to the manifold 71.

A pipe or conduit 76 connects the main carburetor 75 to the air cleaner 77, and another pipe or conduit 79 similarly connects the reforming device 82 to the air cleaner 77. A main throttle valve 74 is interposed between carburetor 75 and adaptor 73 so as to control the flow rate of the mixture thereto from the main carburetor 75, and a secondary throttle valve 25 similarly controls the flow rate of the gas fuel from the reforming device 82, both of the throttle valves 74 and 25 being interlocked by means of a cam or the like, not shown, and linked to the acceleration pedal, also not shown. A fuel pump 6 is driven by means of the engine 70 and serves to deliver fuel from a fuel tank 11 to the main carburetor 75 as well as to the reforming device 82, through means of pipes or conduits 80 and 81, respectively. The reforming device 82 may thus be regarded as an auxiliary carburetor, and 7 is a pressure relief valve operatively associated with fuel tank 11, pump 6, and fuel conduit 80.

Within the embodiment of the present invention having the aforenoted arrangement, when the engine 70 is started, the fuel pump 6 is driven thereby so as to supply fuel to the main carburetor 75 and the reforming device 82. Air being sucked in by the engine 70 is conducted, through means of air cleaner 77, into the main carburetor 75 and the reforming device 82, and within the main carburetor 75, a specified lean mixture is formed between the fuel supplied and the air introduced, such being performed in a manner similar to that accomplished by means of a conventional carburetor, the amount of the mixture to be formed being controlled by means of the main throttle valve 74. Within the reforming device 82, a specified rich mixture is similarly formed, however, as described hereinafter, as a result of the presence of the reforming device, the rich mixture obtained is a gas fuel containing hydrogen, or in other words, it is a rich mixture composed of a reformed fuel, its flow rate being controlled by means of the auxiliary or secondary throttle valve 25.

The lean mixture from the main carburetor 75, while flowing through adaptor 73 and into the intake manifold 71 down-stream thereof, is blended with the rich mixture, introduced through means of an inlet 78 provided within adaptor 73, from the reforming device 82. The blended mixture is in turn conducted into the intake manifold 71 and is ultimately sucked into each engine cylinder through means of the intake manifold 71. the main carburetor 75 is set or adjusted for an air/fuel ratio of 20 –40 such that an extremely lean mixture may be supplied, and when this lean mixture is blended with the gas fuel, the heat inherent within the gas fuel promotes the vaporization of the liquid fuel in said lean mixture, yielding a generally uniform mixture which is then supplied to the engine for combustion.

For the purpose of controlling the engine operation as desired the overall air/fuel ratio averaging the lean mixture and the rich mixture, and the total volume of the blended mixture must be controlled, and consequently, the air/fuel ratio matching is performed separately for the main carburetor and for the auxiliary carburetor. The ratio of the rich mixture to the lean mixture, that is, the flow ratio, is set or adjusted when the opening of the main throttle valve is interlocked with that of the auxiliary throttle valve, with a desired ratio, and thus the volume of each mixture can be controlled by means of the operation of the acceleration pedal within which the throttle valves are linked. Accordingly, the overall air/fuel ratio and the total volume of the mixtures can be controlled. The aforenoted has been described in connection with a reformed gas addition system, and when application is to be made to a stratified charge combustion system, modification has only to be made, such that, as illustrated within FIG. 6, a reformed gas, instead of the rich mixture, is introduced into the auxiliary combustion chamber The structure and function of the motor-vehicle mounted fuel reforming device for an internal combustion engine, constructed in accordance with the present invention, will now be further described by means of the following examples.

EXAMPLE 1

The first exemplary fuel reforming device for an internal combustion engine will be described with particular reference being made to FIG. 13, wherein it is seen that the system includes an air flow metering device 1, a fuel reforming device 2 operatively associated therewith, a fuel flow controlling device 3, consisted of a fuel flow control valve 3a and a fluid pressure control valve 3b, a fuel injection nozzle 4 disposed within the upper portion of fuel reforming device 2 and operatively connected to fuel flow controlling device 3 through means of fuel conduits 29 and 30. A starter valve 5 which increases fuel during engine start is fluidically connected to conduits 29 and 30 through means of a fuel conduit 31, and a fuel pump 6, a pressure relief valve 7, and a fuel tank 11 are also disposed within the system. A power source is shown at 10, and a start switch is electrically connected to source 10 as well as to valve 5 for operating the same, an igniter 8 also being disposed within the system and operatively associated with a fuel reforming device 2.

In the operating conditions, the air for combustion flows in the direction of the arrow m into an air suction pipe 12, and around a baffle plate 13 and a return spring 14, of air flow metering device 1, and the same passes through an air hole, not shown, of a fixed holding plate 15, and into the annular air nozzle 18 of the fuel reforming device 2 so as to thereby form an annular jet flow $\phi$ in the direction of the arrows, within the annular chamber 18a. Since the internal pressure of the ante chamber 20 upstream of nozzle 18 becomes less than that of the combustion chamber 21 downstream of nozzle 18, due to the suction or vacuum action of this annular jet flow, a portion of the burning gas spontaneously moves toward the ante chamber 20, forming a recirculation flow φ in the direction of the arrows. The fuel injection nozzle 4 ejects a fine spray of fuel which has been metered by means of the fuel flow control device 3, and the fuel jet, while being preheated when in contact with the hot recirculation flow φ, is blended with the annular jet flow φ of air for combustion, the resultant mixture passing through the central ofifice 18b of the annular air nozzle 18.

A portion of the fuel injection may adhere to the wall surfaces of the mixture tube 22 and the supporting plate 22a and such fuel is heated and vaporized whereby the same will burn while being blended with the annular jet flow and the fine spray of fuel within the combustion chamber 21 and the circulation chamber 21a, thereby yielding the annular jet flow φ and the hot circulation gas φ, the central stream of the annular jet flow φ flowing in the direction of the arrow φ through the central channel of the mixture distribution tube 22, together with a part of the injection fuel flow. Said fuel flow is vaporized and blended with the fuel gas within the vaporization chamber 23 and the same exits out of the vaporization chamber 23 through means of a plurality of outlet ports 23a and is subsequently conducted through a catalyst 70b and a mixing chamber 24 so as to pass by the secondary throttle valve 25, which is freely controllable, and as a mixed stream with the mixture from the main carburetor, not shown, or as an independent stream, flows through a duct 26 and into the cylinders of the engine.

Within the fuel supply system, the motor-driven fuel pump 6 supplies fuel from the fuel tank 11 through means of a duct 27 to the fuel flow control device 3, and a return duct 28, which branches off from the duct 27 midway between tank 11 and fuel flow controlling device 3, leads back to tank 11, a pressure relief valve 7, disposed within duct 28, serving to maintain a constant fuel pressure. The fuel metered by means of the fuel flow controlling device 3 is conducted through the ducts 29 and 30 so as to tangentially flow into a vortex chamber 4b of nozzle 4, through means of an inlet 4a and a check valve 4c, and the same is subsequently ejected, as a whirling flow, at high velocity into the combustion chamber 21.

In order to meter or supply a related volume of intake air for combustion and a concomitant volume of fuel to also be supplied therefor, a pressure signal proportional to the volume of intake air is generated, and this signal is converted within the fuel gauge to a plunger stroke. The measuring port area of the fuel gauge is determined so as to be in balance with the return spring, and the measurement is performed by setting a specific pressure difference of the fuel flow before and after the same passing the measuring port. Measurement of the volume of suction air is performed within the air flow metering device 1, and within the air flow metering device 1, a return spring 14 is stretched between the movable baffle plate 13 and the fixed holding plate 15, which has a hole therein so as to facilitate passage therethrough of the suction air and which is fixed to the suction pipe 12.

The baffle plate 13 generates a fluid pressure difference due to its fluid drag, and at the same time it is displaced, relative to the expansion pipe 12a and in the direction of the air flow m through pipe 12, as a result of the interaction between the fluid drag and the elasticity of the return spring 14 so as to reach equilibrium under such conditions. Thus, as a result of the relative action of all of the components, a pressure difference, which is linearly proportional to the volume of the suction air, is continuously defined upstream and downstream of the baffle plate 13. The upstream pressure associated with baffle plate 13 is transmitted through a pressure outlet port 16, while the downstream pressure is similarly transmitted through a pressure outlet port 17. These pressures are respectively transmitted through means of the air pressure ducts 32 and 33 to the air pressure inlet ports 34 and 35 of the fuel flow controlling device 3, and ultimately to the pressure chambers 36 and 37 defined upon opposite sides of a diaphragm 38.

The diaphragm 38, upon receiving the differential pressures of the upstream and downstream chambers associated with the baffle plate 13, displaces itself in the axial direction against the biasing forces of axially disposed springs 39 and 40 operatively associated with a measuring plunger 41, while at the same time, it slides and causes a relative displacement of a sleeve 42 which controls the measuring plunger 41 through means of a contact needle 41b, thereby successively altering the fuel metering area constituted by means of a land 41a and a metering groove 42a provided upon the sleeve 42. In other words, a fuel metering area proportional to the volume of suction air is determined and the necessary metering area and position are settled through means of a power balance based upon the differential pressure generated as a result of the volume of suction air and the return spring force It is noted that the back pressure chamber 43 of the measuring plunger 41 also communicates through means of a pressure port 44 and a duct 45 with air pressure duct 33, such structure serving to equalize the pressures acting upon both ends of the plunger 41 so as to thereby prevent a biased action due to unbalanced forces. In addition, it disperses a slight leakage of fuel, through the gap defined between the plunger and sleeve, into the flow of the air suction pipe 12 through means of the air pressure ducts 45 and 33.

The fuel supplied from the fuel pump 6 is conducted through means of fuel duct 27 and an fuel inlet port 47 of the fuel flow controlling device 3 into a primary chamber 48, and from the latter, the fuel may pass through a primary channel 49 and into an annular channel 50 of plunger 41 through means of a port 42b defined within sleeve 42, whereupon the same can enter the metering groove 42a running radially through sleeve 42, another annular channel 46, a radially extending secondary channel 51, and a secondary chamber 52. The effective fuel passage area of the metering groove 42a is determined by the relative sliding displacement of the land 41a of plunger 41 which occurs in response to a pressure signal of the suction air, and consequently, if the difference between the pressures upon opposite sides of the effective fuel passage area, which depends upon the metering groove 42a, is constant, the volume of fuel to be metered at the passage area will depend solely upon the displacement of plunger 41.

This constant pressure difference is assured by the arrangement of the primary chamber 48, a diaphragm 55 disposed within the device and defining chambers 48 and 52, the secondary chamber 52, a constant differential pressure spring 56 for biasing diaphragm 55, and a vertical pipe or conduit 53. The pressure acting within the primary chamber 48 is balanced by the sum of the pressure acting within the secondary chamber 52, as transmitted by the diaphragm 55, and the force of the constant differential pressure spring 56. If the tip area of the vertical pipe 53 is designed so narrow as to be able to be neglected as compared with the diaphragm area, then the pressure within the secondary chamber 52 will become lower by an amount equivalent to the force of the constant differential pressure spring 56, and consequently, the sliding displacement of the measuring plunger 41 within sleeve 42 controls the fuel passage area under a constant pressure difference.

In this way the metered fuel is supplied to the inlet 4a of the fuel injection nozzle 4 through means of the outlet pipe 54 and the fuel ducts 29 and 30, and the fuel thus supplied, is ejected toward the circulation gas inlet 18d of the annular air nozzle 18 so as to be ignited by means of the igniter 8. Thus, with the annular jet flow $\phi$ formed as a result of the blending of the suction air and the metered fuel within the fuel reforming device 2, the fuel mixture can be reformed in accordance with the aforenoted process.

The igniter 8 is seen to comprise a high voltage generator 68 and a spark plug 69 electrically connected thereto. A spark discharge occurs between an electrode 69a of spark plug 69 and an electrode 18c secured to the outer surface of the annular air nozzle 18, the electrodes being disposed opposite to each other with adequate spacing therebetween, and disposed within the gap, defined between the annular air nozzle 18 and the mixture distribution tube 22, immediately downstream of the annular jet flow $\phi$. Within the path of the reformed gas being conducted out of the vaporization chamber 23 and being delivered under the negative pressure of the engine to the duct 26, that is, at the lower end of the fuel reforming device 2, an alumina grating 70c and a catalyst 70b are retained within the fuel reforming device 2 by means of a metal screen or dish 70a. As stated above, the catalyst comprises a nickel-coated alumina-silica-magnesia carrier.

As noted heretofore, the reaction within the fuel reforming device 2 can be divided into the initial reaction with its ancillary reaction, within which the fuel is reformed by means of the spark discharge occurring at the spark plug 69 and the subsequent reaction, which occurs when the reformed gas comes into contact with the catalyst 70b. Within the initial reaction, with its ancillary reaction, the major reaction is combustion whereby the necessary heat, to vaporize and blend the remainder of the mixture and sustain the subsequent reaction, is supplied as a result of igniting and burning a portion of the fuel, and the necessary steam and carbon dioxide for generating the reactions between the hydrocarbons and the steam, and between the hydrocarbons and the carbon dioxide within the subsequent reaction, are also supplied. The subsequent reaction, which utilizes the steam and carbon dioxide, yielded within the initial reaction, and the heat generated thereby, and a portion of the injected fuel fow, produces a reformed gas increase hydrogen and ethylene which is primarily aimed.

For the purpose of assuring proper engine start performance (cold starting), a start controller is provided which diverts a portion of the pressurized fuel flow from the fuel pump 6, midway of the fuel duct 27 which leads to the fuel flow controlling device 3, and directly supplies an increased volume of fuel to the fuel injection nozzle 4. the start controller includes an orifice 57, the fuel duct 31 fluidically connected to ducts 29 and 30, and a starter valve 5 which supplies an increased volume of fuel. When, for instance, an electromagnetically operated valve is employed as the starter valve, and the start switch 9 is interlocked with the engine starter key system, an increased volume of the necessary fuel will be supplied only during engine starting, thereby promoting the atomization and mixing of the fuel injected and preventing a time lag within the initial fuel flow through the fuel ducts and the metering instrument with the result that the intial ignition performance can be substantially improved.

EXAMPLE 2

Figure 13:
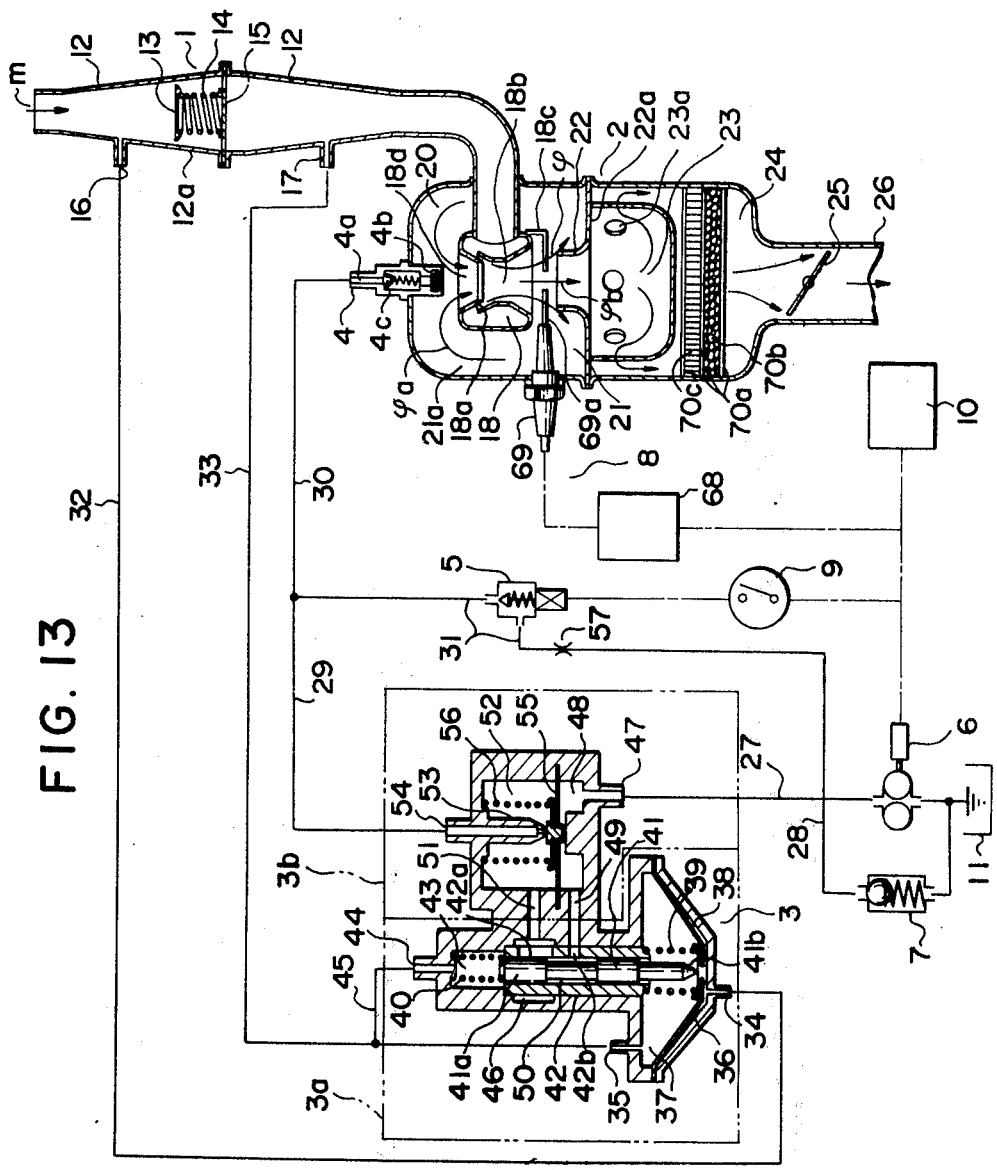
FIGS. 13 and 14 are views similar to that of FIG. 12, showing however additional embodiments of the present invention.
Figure 14:
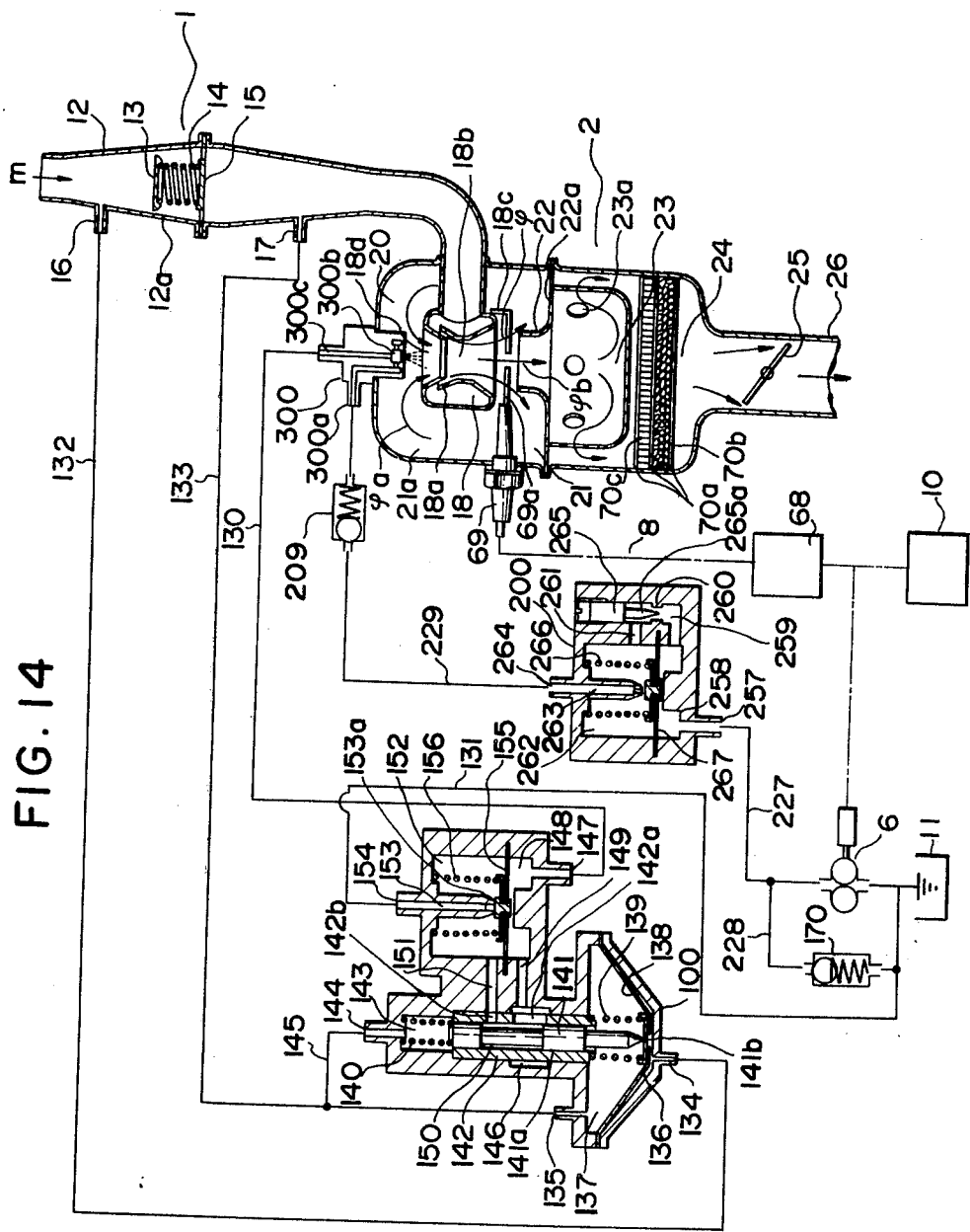

As shown within FIG. 14, the present embodiment of the subject invention is seen to be quite similar to the embodiment of FIG. 13 and is seen to include the air flow metering device 1, the fuel reforming device 2, a fuel flow controlling device 100, the fuel injection nozzle 300, a fuel flow regulating device 200, the fuel pump 6, the pressure relief value 170, the igniter 8, a nonreturn valve 209, the power source 10, and the fuel tank 11.

The air for combustion flows through the suction pipe 12 in the direction of the arrow m and passes around the baffle plate 13 and the return spring 14 and flows through the air port of the fixed holding plate 15 and into the annular air nozzle 18 of the fuel reforming device 2 so as to generate an annular jet flow $\phi$, as seen by the arrows, within the annular jet port 18a. As a result of the annular jet flow, the internal pressure of the ante chamber 20 upstream of nozzle 18 becomes less than that of the combustion chamber downstream of nozzle 18 and in consequence thereof, the ignited gas within combustion chamber 21 spontaneously moves back toward the ante chamber 20, thereby making a recirculation flow $\phi_a$ in the direction of the arrows.

The fuel injection nozzle 300 delivers, toward the circulation gas inlet 18d and as a jet spray, the fuel which has been metered by the fuel flow controlling device 100 and the fuel flow regulating device 200, and this fuel jet, being preheated as a result of being in contact with the hot recirculation flow $\phi_a$, mixes with the annular jet flow $\phi$ of the combustion air and flows through the central port 18b of the annular air nozzle 18. A portion of the fuel jet may adhere to the wall surfaces of the mixture distribution tube 22 as well as to the support plate 22a, and the same will be heated and gasified, and upon being mixed with the annular jet flow $\phi$ and the spray fuel flow within the combustion chamber 21 and the circulation chamber 21a, the same burns so as to yield a hot circulation flow $\phi$ , which, upon recirculating, becomes the central stream of the annular jet flow $\phi$ and, together with a portion of the fuel jet flow, passes through the internal channel of the mixture distribution tube 22 in the direction of the arrow $\phi$.

The fuel is then gasified and blended further by means of the burning gas within the vaporization chamber 23 and subsequently, the same flows out of the chamber 23 through means of a plurality of outlet ports 23a so as to pass by a freely controllable throttle valve 25 after traversing a mixing chamber 24 and the catalyst 70b therewithin, the fuel ultimately flowing into duct 26 so as to be conducted into the engine cylinders as a combined flow with the mixture not shown, or as a single flow.

The fuel, pumped by means of the fuel pump 6 which is driven by means of the motor or the like, is supplied from the tank 11 through means of a duct 27 to the fuel flow regulating device 200. A return duct 228 branches off from duct 227 and leads back to tank 11, and within this return duct 228, there is provided a pressure relief valve 170 which assures a constant pressure for the fuel. A constant supply of fuel metered within and by means of the fuel flow resulting device 200 passes in turn through the duct 229, which has a non-return valve 209 disposed therein, and flows tangentially into the vortex chamber 300b, through the inlet 300a, of the fuel injection nozzle 300. The fuel is ejected in the necessary amount and under high speed rotational conditions into the fuel reforming device 2, the balance of the fuel flowing through an escape port 300c of nozzle 300 and into duct 130 so as to be conducted toward the fuel flow controlling device 100, wherein the fuel is metered in inverse proportion to the volume of the suction air. The fuel which has thus escaped is conducted in turn through another conduit or duct 131 into the suction side of the fuel pump 6 or alternatively, is directly returned to the tank 11.

As for the relationship between the volume of suction air for combustion and the volume of metered fuel, a constant supply of fuel which is required at all times as metered by means of the fuel flow regulating device 200, is entirely delivered or supplied to the fuel injection nozzle 4. The escape flow from the injection nozzle is in turn metered by means of the fuel flow controlling device 100 in inverse proportion to the volume of suction air, and finally, a volume of fuel proportional to the volume of suction air is supplied to the burner or combustion chamber. The metering of the variable fuel volume is accomplished as a result of a pressure signal proportional to the volume of suction air being generated which signal is converted to a stroke within the fuel flow controlling device 100. In addition, through means of a power balance with the return spring, the metering port area is determined, thereby metering the fuel flow.

The metered volume of suction air is adjusted at the return spring 14, which is held within the air flow metering device 1 between the movable baffle plate 13 and the holding plate 15, the latter of which is provided with a suction air port and is fixed to the suction pipe 12. The baffle plate 13 creates a difference in the fluid pressure due to its fluid drag, and it ultimately attains equilibrium with a relative displacement with respect to the expansion pipe 12a in the direction of the suction air flow as a result of the interaction between the aforenoted fluid drag and the elasticity of the return spring 14.

In this way, as a result of the interaction between the different components noted hereinbefore, a pressure difference linearly proportional to the suction air volume is always produced with respect to the areas or chambers upstream and downstream of baffle plate 13, the pressure upstream of the baffle plate 13 being transmitted by means of pressure outlet port 16, while the pressure downstream of the baffle is transmitted through means of the pressure outlet port 17. These pressures are in turn transmitted through air pressure ducts 132 and 133 to the air pressure inlet ports 134 and 135 within the fuel flow regulating device 200 and subsequently to the pressure chambers 136 and 137 defined upon opposite sides of the diaphragm 138.

The diaphragm 138, upon receiving and being subjected to the pressure difference upstream and downstream of the baffle plate 13, displaces itself in the axial direction against the force of the return springs 139 and 140 installed co-axially with the measuring plunger 141, while at the same time, the diaphragm causes, through means of the contact needle 141b, the metering plunger to slidably traverse a relative displacement with respect to the fixed sleeve 142 thereby continuously changing the fuel metering area constituted by means of the land 141a and the metering groove 142a provided within the sleeve. Thus, a fuel metering area inversely proportional to the volume of the suction air is determined, and through means of the equilibrium established between the differential pressure due to the suction air and the biasing force of the return spring, the necessary metering area position is attained.

The back pressure chamber 143 of the plunger 141, which communicates with the pressure port 144, duct 145, and air pressure duct 133, serves to equate the pressures acting upon both ends of the plunger 141 and thereby eliminate a biased movement thereof due to an unbalance of power, and in addition, disperses a small amount of fuel leakage, from the gap defined between the plunger and the sleeve, through means of the air pressure ducts 145 and 133 and into the flow within the air suction pipe 12.

The fuel supplied from the fuel pump 6 flows through the fuel duct 227 and into a primary chamber 258 of fuel flow regulating device 200, through means of an fuel inlet 257 thereof, and the same also enters a primary duct 259 so as to be conducted to an adjustable fixed orifice 260, where it is metered. The fuel then flows through a secondary duct 261 into a secondary chamber 262, primary chamber 258 and secondary chamber 262 being vertically separated by means of a diaphragm 267. From the top of the secondary chamber 262, a vertical pipe 263 is suspended such that the tip thereof is disposed close to the position of the diaphragm 267, and around the vertical pipe 263 there is provided a constant differential pressure spring 266 which biases diaphragm 267 downwardly. Thus in the same manner as was seen within the embodiment of Example 1, a pressure differential, corresponding to the biasing force of the return spring 266, is generated upon opposite sides of the diaphragm 267 within the primary and secondary chambers, and consequently, the pressure difference upstream and downstream of the fixed orifice 260 can be set at a constant value.

Therefore, the volume of fuel passing through the fixed throttle 60 under a constant pressure difference is always constant and the entire volume is conducted to the inlet 300a and the vortex chamber 300b of nozzle 300 through means of the outlet 264 and the nonreturn valve 209. The remainder of the fuel, after ejection into the fuel reforming device 2, flows through the escape port 300c and into the primary chamber 148 of fuel flow controlling device 100, through means of inlet 147, and ultimately passes through the primary duct 149 and the annular channel 146 defined around sleeve 142, and the metering groove 142a radially defined within the sleeve 142 so as to flow into the secondary chamber 152 through means of channels 150 provided within plunger 141 and the secondary duct 151.

The effective fuel passage area to be controlled by means of metering groove 142a is determined as a result of land 141a, of plunger 141, receiving a pressure signal of the suction air volume, whereupon the same traverses a sliding displacement relative to the metering groove 142a within sleeve 142, and overlapping the metering groove 142a in response to the signal. For the purpose of rendering the pressure difference upstream and downstream of the metering groove 142a constant, and thereby always metering a volume of fuel proportional to the displacement of the plunger 141, a constant pressure difference adjuster is provided within the fuel flow controlling device 100 and is seen to include the primary chamber 148, the diaphragm 155, the secondary chamber 152, the return spring 156, the vertical pipe 153, and the flow orifice 153a, the working principle of the adjuster being similar to that of the fuel flow regulating device 200.

The suction air and the metered fuel are mixed within the fuel reforming device 2, thereby making an annular jet flow $\phi$, and continuous ignition and combustion are assured by means of the igniter 8, the fuel being reformed as the same passes through the flow process. The igniter 8 comprises the high voltage generator 68 and the spark plug 69, and the spark is discharged between electrode 69a of spark plug 69 and electrode 18c which is secured to the annular air nozzle 18, the electrodes being opposed to each other at an appropriate distance apart and are also interposed within the gap defined between the annular air nozzle 18 and the mixture distribution tube 22 at a position downstream of the annular jet flow $\phi$. In a manner similar to that as the embodiment of Example 1, the fuel gas thus reformed, as it passes through the gap within the alumina grating 70c, supported by means of a metal screen or dish 70a, and through the catalyst bed 70b, reacts with the catalyst so as to thereby further promote the generation of $CO$, $H_2$ and the like.

Obviously, many modifications and variations of the present invention are possible in light of the above teachings. It is to be understood therefore that within the scope of the appended claims, the present invention may be practiced otherwise than as specifically described herein.

What is claimed is:

1. An air fuel mixture supplying system for an internal combustion engine having a combustion chamber to which said supplying system supplies the mixture and which is defined by a cylinder, a cylinder head and a piston operably disposed within said cylinder, comprising:
   a main air fuel mixture supplying pipe connected to the adjacent atmosphere at one end thereof and said combustion chamber at another end thereof;
   a main fuel supplying device for supplying the fuel into said main pipe wherein the fuel is mixed with air introduced from the adjacent atmosphere;
   an auxiliary air fuel mixture supplying pipe connected to the adjacent atmosphere at an end thereof and said combustion chamber at the another end thereof and disposed parallel said main pipe;
   means for metering the air flow through said auxiliary pipe and generating a pneumatic signal corresponding to the air flow;
   a fuel reforming device disposed at downstream of said metering means and in said auxiliary pipe, said fuel reforming device having another combustion chamber connected to said auxiliary pipe at the downstream of said air flow metering means, means for injecting the fuel into said another combustion chamber, means for igniting the mixture of the air and the fuel introduced and means for generating a recirculation flow in said another combustion chamber, so as a portion of the mixture ignited to be burned is recirculated to thereby be mixed with the air and the fuel newly introduced into said another combustion chamber;
   a fuel source for supplying the fuel; and
   means for controlling the fuel flow to be supplied to said fuel injecting means in accordance with said pneumatic signal thereby the air fuel ratio of the air fuel mixture in said another combustion chamber being kept at predetermined value.

2. An air fuel mixture supplying system according to claim 1, wherein said fuel reforming device comprises a cylindrical vessel within which said another combustion chamber is defined, whereby the recirculation flow is generated in such a manner that a central axial flow of the air fuel mixture flows down along the axis of said cylindrical vessel and is ignited, some portion thereof flows out of said vessel, other portion thereof flows radially diverged, and said other portion becomes an annular axial flow which comes up along and near the inside of the side wall of said vessel and then converges toward said central axial flow.

3. An air fuel mixture supplying system according to claim 2, wherein said recirculation flow generating means comprises a cylindrical guide means coaxially disposed in said another combustion chamber, said central axial flow flowing inside of said cylindrical guide means, said annular axial flow flowing between said cylindrical guide means and said side wall of said vessel, and said vessel has an exit opening disposed at around the center of and in the bottom thereof, through said exit opening said some portion of the mixture flowing out of said another combustion chamber.

4. An air fuel mixture supplying system according to claim 3, wherein said cylindrical guide means has an annular passage which is connected to said auxiliary pipe and which has an annular slit at the inside, the air being introduced through said annular slit and mixed with said central axial flow, wherein said fuel injecting means is disposed at around the center of the upper end of said vessel so that the fuel is injected toward said central axial flow, and wherein said igniting means has electrodes between said cylindrical guide means and said exit opening.

5. An air fuel mixture supplying system according to claim 1, wherein said fuel reforming device further comprises a vaporization chamber connected to said another combustion chamber and a catalyst bed therein wherein the mixture of the air and the fuel is partially burned within said another combustion chamber, heated up within said vaporization chamber thereby the still existing liquid fuel being vaporized and further burned and decomposed by said catalyst during flowing said catalyst bed.

6. An air fuel mixture supplying system according to claim 5, wherein said catalyst bed comprises a catalyst carrier and catalyst coated on said catalyst carrier.

7. An air fuel mixture supplying system according to claim 6, wherein said catalyst carrier is composed of material of alumina-silica-magnesia.

8. An air fuel mixture supplying system according to claim 5, wherein the material of said catalyst is nickel.

9. An air fuel mixture supplying system according to claim 1, wherein said air flow metering means comprises an upstream cone-shape pipe which is adapted so that the cross sectional area thereof increases in downward direction, a downstream pipe connected to said upstream pipe, a baffle plate in said upstream pipe, and a return spring mounting said baffle, said baffle plate and said spring being arranged so as said baffle plate is depressed down as the air flow increases thereby the effective air flow cross sectional area defined between said baffle plate and said upstream pipe being increased, said upstream pipe having an upstream pressure outlet port opened upstream of said baffle plate, said downstream pipe having a downstream pressure outlet port.

10. An air fuel mixture supplying system according to claim 1, wherein said fuel flow controlling device comprises a fuel flow control valve and a fluid pressure control valve, said pressure control valve having an inlet for receving the fuel from said fuel source, an outlet for delivering the fuel to said fuel injecting means and means for keeping the fluid pressure difference between the pressures at said inlet and said outlet constant, said fuel flow controlling device having a fuel flow control valve connected to said inlet at the upstream thereof and to said outlet thereof.

11. An air fuel mixture supplying system according to claim 10; wherein said fuel flow controlling device further comprises a diaphragm chamber, a first diaphragm mounted in said diaphragm chamber, said diaphragm chamber being divided by said first diaphragm into first and second diaphragm chambers, said first diaphragm chamber being connected to said auxiliary pipe at the upstream of said air flow metering means, said second diaphragm chamber being connected to said auxiliary pipe at the downstream of said air flow metering means, and a compression spring mounted in said second diaphragm chamber, said compression spring being biased said first diaphragm toward said first diaphragm chamber; and wherein said fuel flow control valve has an orifice connected to said inlet and said outlet, a valve body operably engaging with said orifice to control the effective cross sectional are of said orifice so that the fuel flow is controlled and a valve stem connected to said first diaphragm, whereby the fuel flow supplied to said fuel injecting means is controlled at predetermined rate with respect to the air flow introduced to said fuel reforming device.

12. An air fuel mixture supplying system according to claim 10, wherein said fluid pressure difference keeping means comprises a fluid chamber, a second diaphragm mounted in said fluid chamber thereby said fluid chamber being divided into a first fluid chamber and a second fluid chamber, said first fluid chamber having said inlet, said second fluid chamber having said outlet, a pressure control valve, a conduit disposed in said second fluid chamber, said conduit having said outlet at an end thereof and a valve seat at another end thereof, said pressure control valve being arranged to seat on said valve seat, and a constant differential pressure spring disposed within said second fluid chamber so that said constant differential pressure spring is biasing said second diaphragm off the valve seat, whereby the pressure of the fuel in said second fluid chamber is controlled at a lower pressure than the pressure in said first fluid chamber by a predetermined pressure corresponding said constant differential pressure.

13. An air fuel mixture supplying system according to claim 10, wherein said fuel flow control valve comprises a sleeve having a groove curved in axial direction on the surface of the inside wall of said sleeve, and a piston valve slidably disposed within said sleeve, said piston valve being arranged to control the opening width of said groove corresponding to said pneumatic signal thereby the fuel flow being controlled.

14. An air fuel mixture supplying system according to claim 1 further comprising an additional fuel supplying device which is adapted to supply an additional fuel to said fuel injecting means at engine start.

15. An air fuel mixture supplying system according to claim 14, wherein said additional fuel supplying device comprises a solenoid valve, said solenoid valve being adapted to be charged during the engine start thereby said valve being opened to supply the additional fuel.

16. The air fuel mixture supplying system according to claim 1, wherein said fuel flow controlling means comprises a fuel flow regulating device connected to said fuel source, said fuel flow regulating device being adapted to regulate the pressure of the fuel to be delivered to said fuel injecting means, and a return fuel flow controlling device connected to said fuel injecting means, said return fuel flow controlling device being adapted to control the fuel flow returning from said fuel injecting means in inverse proportional to the air flow through said air flow metering means thereby the amount of the fuel to be supplied by said fuel injecting means to said reforming device being in proportional to the air flow supplied to said reforming device, and wherein said fuel source having a fuel tank and a fuel pump, the fuel flowing out of said return fuel fow controlling device being discharge to said fuel tank.

17. An air fuel mixture supplying system according to claim 16 further comprising a check valve disposed between said fuel flow regulating device and said fuel injecting means whereby the fuel flow is only directed from said fuel flow regulating device toward said fuel injecting means.

18. An air fuel mixture supplying system according to claim 17 further comprising a pressure relief valve connected to the downstream of said fuel pump and upstream of said fuel flow regulating device, and to said fuel tank whereby some of the fuel discharged from said fuel pump is drained back through said pressure relief valve to said fuel tank.

* * * * *